(12) United States Patent
Hernandez Hernandez et al.

(10) Patent No.: US 7,381,310 B2
(45) Date of Patent: Jun. 3, 2008

(54) INSTALLATION USED TO OBTAIN SALT-FREE SEA WATER AT A LOW TEMPERATURE WITH CONTINUOUS OPERATION AND ENTHALPY RECOVERY

(76) Inventors: Maria Fernando Hernandez Hernandez, Mirador Sierra de Madrid, 15, E-28400 Collado Villalba (ES); Francisco Fernadnez De Mazarambroz Bernabeu, Communidad de Madrid, 25, 1ª , E-28230, Las Rozas (ES)

( * ) Notice: Subject to any disclaimer, the term of this patent is extended or adjusted under 35 U.S.C. 154(b) by 0 days.

(21) Appl. No.: 10/492,509

(22) PCT Filed: Oct. 11, 2002

(86) PCT No.: PCT/ES02/00484

§ 371 (c)(1),
(2), (4) Date: Sep. 7, 2004

(87) PCT Pub. No.: WO03/033412

PCT Pub. Date: Apr. 24, 2003

(65) Prior Publication Data

US 2005/0011743 A1    Jan. 20, 2005

(30) Foreign Application Priority Data

Oct. 13, 2001    (ES)    ................................ 200102272

(51) Int. Cl.
*B01D 3/02*    (2006.01)
*C02F 1/04*    (2006.01)
*B63J 1/00*    (2006.01)

(52) U.S. Cl. ................ 202/176; 159/43.1; 159/DIG. 2; 202/185.4; 202/187; 202/189; 202/197; 202/201; 202/203; 203/10; 203/22; 203/40; 203/DIG. 17; 203/27; 203/DIG. 18

(58) Field of Classification Search ................ 202/176, 202/185.4, 187, 189, 197, 201, 203; 159/43.1, 159/DIG. 2; 165/911, 913; 203/10, 22, 203/DIG. 17, 27, 40, DIG. 18
See application file for complete search history.

(56) References Cited

U.S. PATENT DOCUMENTS 1,966,938 A * 7/1934 Stone .......................... 203/26

(Continued)

FOREIGN PATENT DOCUMENTS

| DE | 3712785 | 3/1998 |
| ES | 2087819 | 7/1996 |
| ES | 2155758 | 5/2001 |

OTHER PUBLICATIONS

International Search Report for Patent Application No. PCT/ES02/00484, dated Jan. 16, 2003.

*Primary Examiner*—Virginia Manoharan
(74) *Attorney, Agent, or Firm*—Kirkpatrick & Lockhart Preston Gates Ellis LLP

(57) ABSTRACT

A sea water desalination installation that employs an evaporation-condensation system which operates continuously at a low temperature and which enables the recovery of energy released. The installation includes a cylindrical evaporator having a large evaporation surface and a concentric condenser with a large surface area. Sea water is used to cool the condenser and said water is subsequently sent to the evaporator. A static high-pressure ventilator is used to: (i) drive the vapor/air in a closed circuit between the evaporator and the condenser and (ii), using a calibrated nozzle, create a pressure gradient that is equivalent to the pressure of the saturated vapor at working temperature between said two zones. The aforementioned evaporator and condenser are thermally insulated in relation to one another and to the external environment.

2 Claims, 3 Drawing Sheets

U.S. PATENT DOCUMENTS

| | | |
|---|---|---|
| 3,190,817 A | 6/1965 | Neugebauer et al. |
| 3,619,378 A * | 11/1971 | Ricard .................... 202/173 |
| 4,269,663 A * | 5/1981 | McFee ................... 202/185.3 |
| 4,441,963 A * | 4/1984 | Li ........................... 202/172 |
| 4,863,567 A * | 9/1989 | Raley ..................... 202/182 |
| 4,880,504 A | 11/1989 | Cellini et al. |
| 5,111,856 A * | 5/1992 | Baralle .................... 141/230 |
| 5,951,825 A * | 9/1999 | Land ....................... 202/83 |
| 2002/0011075 A1* | 1/2002 | Faqih ...................... 62/285 |
| 2005/0045466 A1* | 3/2005 | Bitterly et al. ............ 203/100 |

* cited by examiner

INSTALLATION USED TO OBTAIN SALT-FREE SEA WATER AT A LOW TEMPERATURE WITH CONTINUOUS OPERATION AND ENTHALPY RECOVERY

The invention relates to a plant which desalinates seawater, thereby obtaining salt-free water suitable for many purposes, although an additional process is necessary to provide drinking water.

BACKGROUND OF THE INVENTION

Coastal regions are experiencing a constant increase in population due not only to tourism but also to an aging population from wealthier countries who are able to enjoy retirement in places far from, and more agreeable than, the industrial and commercial towns and cities where they have spent their working life. However, their demand for all the modern comforts they are accustomed to has resulted in coastal resorts having to meet an ever-rising need for a water supply suited to every type of domestic use. This is occurring in every country where tourism, retirement and coastal resorts coincide. Paradoxically, it is where there is an abundance of sea-water that there is also a scarcity of fresh water. Many different methods have been adopted in the search to provide an adequate domestic water-supply, ranging from the modification of river-basins to the construction of devices designed to remove salt from the readily accessible sea water.

There are basically three different methods employed by desalination plants each of which gives rise to various sub-processes.

The method mostly frequently found is that known as "inverse osmosis". It is based on the use of semi-permeable membranes which allow water, but not salt, to pass through. High-pressurization techniques are required in this process to overcome the osmotic pressure whose natural action is the contrary of that desired in desalination. This system treats part of the water drawn from the sea, returning the remainder, with a corresponding increase in salinity, to the sea. A counter-pressure effect is needed to cleanse the filters. These plants are costly; there are few enterprises producing membranes; maintenance requires much skill and attention. Energy consumption is low.

Another method, namely that of freezing sea-water to obtain salt-free water is based on the displacement of salt ions that occurs when water containing them is frozen. This freezing process must be carried out in layers of geometric progression to allow displacement of the non-frozen water, and at a speed which allows the salt ions to move while the water is still liquid. These plants consume the energy necessary to change sea-water from liquid to solid. Various procedures have been devised to help lower consumption and recycle energy.

Because of its simplicity, the vaporization-condensation method is more commonly used than the freezing process. However, it has the drawback of an unfortunately high consumption of energy since the heat necessary for changing liquid to steam must always be provided. Various systems for reducing this energy consumption have been devised such as lowering pressure so that the liquid boils at a temperature lower than the 100° C. necessary at atmospheric pressure: waterfall vaporization: use of solar energy, etc., but in every case heat has to be provided to convert the material from one state to another. Therefore, the most appropriate way of reducing energy consumption is by recovering heat generated. The chief drawback in systems for recovering energy lies in the manner of carrying out the recovery.

The invention presented here avoids this pitfall by a simple system in which sea-water is used in the condenser's cooling circuit and this consignment of water is then sent to the vaporizer where, as less than 10% of the water evaporates, the volume of water in the cooler can be adjusted for the transference of heat.

Bearing in mind just how abundant sea-water is, the invention is designed to desalinate only a portion of the water it takes from the sea, returning the rest to its source. It is calculated that the system proposed here will allow desalination of 5-7% of the volume of water drawn from the sea; the remainder being returned corresponding increase in salinity. Accordingly, the invention provides a desalination plant using the vaporization-condensation system, at low temperatures, in continuous session, and recycling the heat generated during condensation.

In the present invention, water drawn from the sea and preheated up to 40° C. is used for evaporation (A temperature of 60° C. is considered the upper limit.) Two phenomena occur during evaporation: first, the cooling of the water to 20° C., secondly, the heat difference in the water is instrumental in evaporating a small part of it. The evaporated water is sent to a cooling unit whose mission is to condense it to be free of salt. A static high-pressure fan is responsible for sending the steam from the vaporization area to the condensation area; The invention makes use of the fan's characteristics to create a difference in pressure (equal in magnitude to the pressure of steam at vaporization temperature) between the condensation and the vaporization zones. The process is carried out in the presence of an air-current which acts as the vehicle for transporting the steam. The air is recycled within a closed circuit. The condenser-cooler is refrigerated with sea-water and the outlet of the refrigeration circuit is connected with the entrance to the vaporizer.

DESCRIPTION OF THE INVENTION

The proposed apparatus for desalination is an innovation since it combines the simplicity and low cost of vaporization apparatus with low consumption of energy, thus making it superior to other systems.

The desalination plant described here can provide drinking water from sea-water in one continuous process comprising low temperature vaporization followed by condensation of the salt-free steam, with complete recovery and transfer of energy from the condenser-cooler to the vaporizer, and with the steam carried by the air current within a closed circuit which presents a pressure gradient of some thousand Pascals between the condenser and the vaporizer.

The desalinator is composed of two concentric hollow cylinders of which the circular inner section houses the vaporizing element and the outer section the cooler-condenser. The walls of the two cylinders are thermally insulated to prevent any exchange of heat between vaporizer and condenser or with the external ambience. The walls may be constructed of metal, wood, plastic materials, polyester reinforced with fibre-glass, concrete in the case of large installations, or any other material capable of adapting to the necessary geometries. Communication between vaporizer and condenser is carried out in the upper part of the structure where a fan is placed that provides suction above the vaporizer and drives air over the cooler-condenser. The fan is responsible for all movement of airborne steam, the air current returning to the vaporizer through a calibrated orifice placed in the lower half of the internal cylindrical wall.

A system of vaporization has been devised in which air, partially dry and reduced in pressure by a few thousand Pascals in respect to atmospheric pressure, is made to circulate against a stream of sea-water pre-heated to around 40° C. Indispensable in this process is the enlargement of the surface areas of the vaporizer where the air and water come into contact. This is achieved by the use of very fine sheets of plastic to form a spiral coil with a narrow passage, and radial sheets to maintain the separation necessary to guarantee an extensive area of contact between the sheet of water and the air that is circulating in the opposite direction.

The condensation system is a simple cooler composed of pipes, through which water at the ambient temperature circulates, and provided with fins in the form of a continuous cylindrical sheet. The cooler works on opposing flows and a crosscurrent in the air-steam mixture proceeding from the vaporizer. The heat given off by the cooler in this process is recovered and used to preheat the water being processed. In fact, sea-water is used in this cooler and after the exchange it is sent to the vaporizer without need of an intermediate.

A high-pressure static extractor fan of several thousand Pascals is used for the recirculation of air. Its static pressure is used in combination with calibrated orifices situated in the zone where air is returned to the vaporizer so that pressure is maintained below atmospheric pressure in the vaporizer zone and above atmospheric pressure in the condenser zone.

The sea-water, preheated up to 40° C., enters through the upper part of the vaporizer where a water distributor system ensures even distribution to each part of the vaporization sector. The vaporizer is fitted with a "cooling tower" type filter made of very fine plastic sheets forming a coil, spiral in cross-section, with restricted passages, radial sheets maintaining the separation necessary to guarantee a wide surface for contact, and making the water divide into fine sheets while descending through the vaporizer. At the same time, the fan at the top of the vaporizer forces dry air to circulate against the current of the descending liquid, thus producing evaporation of part of the water, cooling it and simultaneously raising the temperature and the degree of humidity in the air.

The fan sends this warm, humid air towards the condensation zone where it is forced pass through the cooler causing its temperature to fall to below the "dew point" causing condensation of part of the steam which collects at the bottom of the condenser, from where it is extracted by means of a centrifugal pump.

During vaporization, a significant part of the water does not vaporize and collects at the bottom of the vaporizer from where it is pumped back into the sea. This water has an increased salinity corresponding to the quantity left behind by the steam (between 2 and 4 grams per litre, that is to say, between 5% and 10%).

The cooler is composed of various concentric, cylindrical, laminated surfaces which may be made of brass, stainless steel or aluminium. Each surface is encircled by coils of piping of the same material as that through which the refrigeration water circulates. In this way the cooling water is made to move against the air flow and at crosscurrent. The cooler offers a very extensive condensation surface.

The sea-water used in the refrigeration process is warmed by the energy transferred from the condenser and it then enters the vaporizer as the raw material of the desalination plant. Flow, vaporization percentages and temperatures have been calculated to ensure that the heat-matter transferred from the cooler to the vaporizer at this stage of the process is adequate and that the volume of sea water does not need to be increased or decreased. This means that all the heat recovered in the condenser is sent to the vaporizer. There is an auxiliary heater placed between the outlet for the refrigeration water from the condenser and the entrance to the vaporizer.

The energy efficiency of the system depends the efficiency of the cooler which recovers a significant part of the heat carried in the air from the vaporizer to the condenser; and on the efficiency of the vaporizer. Temperatures at the outlets of the residual water and of the treated water should be as low as possible.

The temperature of the residual water should not be more than 1° C. higher than the humid temperature of the circulating air.

The temperature of the treated water should not be more than 1° C. higher than the temperature where the refrigeration water enters the condenser.

In the lower part of the vaporizer where air is admitted, calibrated orifices have been placed in order to lower pressure in this zone and so speed up the transfer of the liquid-steam mass.

The system of calibrated orifices proposed here can create a difference in pressure between the condensation and the vaporization zones of several thousand Pascals as well as recycling the air present in the process and thus allowing optimum use of energy.

With the system proposed, the consumption of energy is less than 5% of that in a conventional installation. This energy is obtained by recovery from other systems of refrigeration. The low temperature required by the process facilitates recovery of energy in respect to systems where, traditionally, criteria of usage have not been applied because of their low energy content per unit of volume.

An ultraviolet lamp has been placed in the upper part of the desalinator in order to prevent the growth of fingi and bacteria.

The kingpin of the system is the fan which must move the air necessary to draw the steam produced, taking into account the pressure of saturated steam at the operational temperature and distributing the difference in pressure between the condenser and the vaporizer. This difference in pressure is calculated on the value permitted by state of the art ventilation. A value which will be maintained as the difference between the condenser and vaporizer in the operational system in the closed circuit of air.

The auxiliary heating unit is inserted between the water outlet of the cooler and the entrance to the vaporizer.

A filter is installed at the entrance to the system to prevent the entrance of algae, sand or other small objects in the sea water.

The system has the following control elements:
Above the air-steam mixture
    Pressure in the vaporizer
    Pressure in lower zone of condenser
    Temperature at vaporizer outlet
    Temperature at condenser outlet
    Pressure difference between condenser and vaporizer
Above the water intake
    Pressure
    Flow
    Temperature
Above outlet of water from cooler
    Temperature
    Pressure
Above water intake to vaporizer
    Temperature Above the area where residual water collects
  Temperature of water
  Maximum level
  Minimum level
Above the area collecting desalinated water
  Temperature of water
  Maximum level
  Minimum level A cylindrical form has been adopted for all the foregoing installations, it being considered agreeable, practical and easily integrated within the types of landscape visualized as the destination of this system. Nevertheless, the form can be modified, the only essential feature to be taken into consideration being that the two zones (vaporizer and condenser) shall be separate and that they must be watertight from one another and from the exterior. The only communication between the two zones should be the fan and some calibrated orifices for the purposes already described. The shape of the vaporizer and condenser may vary substantially but they should always be constructed so that their operation conforms with that described, in the case of the condenser, a cross-flow and counter current system and in the case of the vaporizer, the circulation of air at crosscurrent to the waterflow.

BRIEF DESCRIPTION OF THE DRAWINGS

To complement the descriptions given and help provide a better understanding of the characteristics of this invention, three pages of drawings accompany this specification. These are simply visual guides and are not binding. They represent the following.

PREFERABLE FORMAT OF THE INVENTION

Figure 1:
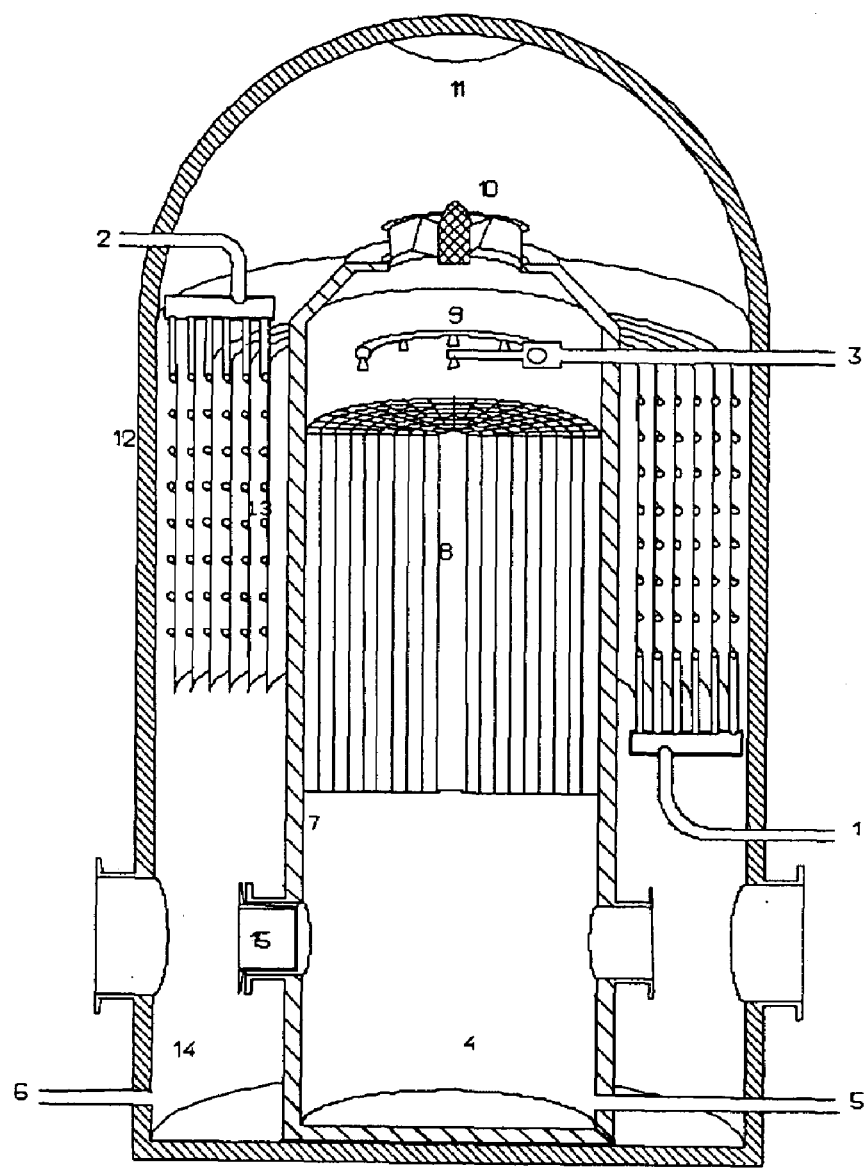
FIG. 1. Perspective view of vertical section at 180° of the invention in one of its possible variations. In this drawing the device is shown with a tubular centrifugal fan.

In FIG. 1 the invention is shown as a cylindrical outer shell completed in the upper part by a hemispherical surface. The interior houses a second cylindrical form completed by a tubular centrifugal fan (10).

In the lower half of both cylinders, two apertures can be seen set into the surfaces, and positioned in such a way that the apertures of the outer cylinder coincide with those of the inner. (16)

As the drawing shows, the device is divided into two areas by the inner cylindrical surface. The vaporization of water takes place in the inner zone and condensation in the outer. In the upper part of the vaporization zone and beneath the fan (10) the device for the distribution of warmed sea-water is placed. The water enters by the duct (3) and is distributed as a mist falling over the fine sheets filling the interior (8). Showering the water in this way facilitates its adherence to the sheets.

The fan (10) moves the air found inside the plant, drawing it from the vaporization zone to the condenser zone and forcing it to return to the vaporizer by way of the apertures (15) situated in the lower half of the body of the vaporizer (17).

In the vaporizer the air circulates in an upward direction coming into contact with the water that is descending through the filling element (8). The air which will have cooled during its passage through the condenser and become saturated at the temperature permissible in the cooler, (a temperature lower than that of the entering water), will now grow warmer allowing vaporization up to saturation condition at this new temperature, while the water falling through the filling element (8) will drop to the temperature of the cooled air that is entering at the lower part of the vaporizer (15) and will lose part of its mass that will evaporate until the air is saturated at the temperature of the water entering from (9), its salinity increasing in proportion to the steam eliminated. This water will fall to the lower part of the vaporization cylinder (4) from where it will be pumped through pipes (5) and returned to the sea. (The pump is not illustrated.) Two instruments situated in zone 4 gauge the maximum and minimum level of the water there and control the centrifugal pump that drives water to or from the sea.

The fan (10) forces the air and steam mixture out of the condenser zone against the inside of the hemi-spherical surface area (18) that encloses the upper part of the device. In this zone a ultra-violet ray lamp (11) has been installed to eliminate bacteria and moulds that are susceptible to its radiation Since the air-steam mixture is unable to escape from the hermetically sealed structure, it is compelled to cross through the cooler-condenser (13) that encircles the vaporizer (17) and go on until it reaches the orifices at the lower part of the vaporizer and, passing through them, returns to the evaporation system.

Figure 3:
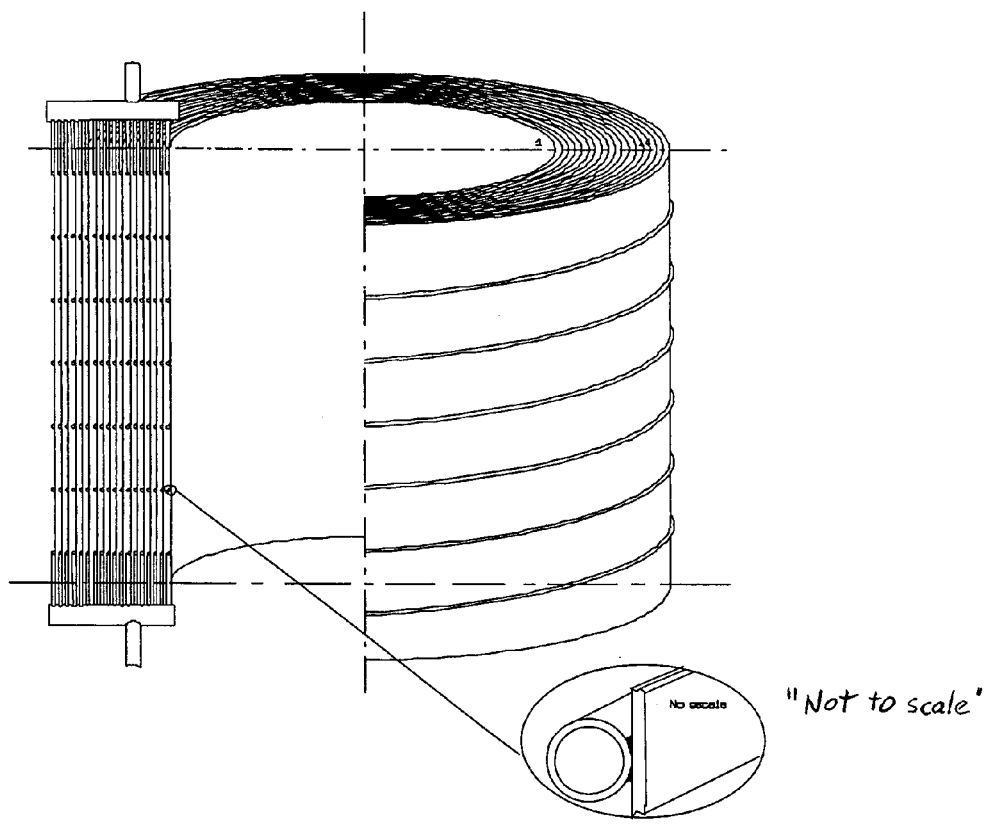
FIG. 3 Perspective view of the invention's cooler-condenser in a vertical section of 270°.

The cooler-condenser (13) is made up of a number of concentric cylindrical surfaces which occupy all the space between the outer wall of the evaporator (7) and the inner wall of the outside casing (12). The cylindrical surfaces in the cooler-condenser are enclosed by a coil of pipes carrying sea-water. (FIG. 3). This piping has been designed so that water remains in it a little longer than is theoretically necessary. This is to allow for the transfer of energy between the volumes of water and air which cross and counter cross in this apparatus. Water enters the system by the intake pipe (1), passing through the distributor tank (18) to the cooler-condenser pipe from where it is distributed by the various cylindrical surfaces contained inside the coil of ascending pipes until it is collected in the deposit tank before being dispatched through the outlet pipe (2) to the exterior.

Sufficient space has been left between the cylindrical surfaces in the cooler-condenser to allow air to pass comfortably.

The passage of the air and steam mixture through the cooler causes condensation of part of the steam, and cooling of the air to the temperature at which the sea water enters the duct of the cooler. The air at the outlet of the cooler reaches the saturation point corresponding to the temperature and is sent to the vaporizer through the calibrated orifices (15). These orifices constitute another of the innovations of the present invention; their calibration is calculated to make the air passing through the orifices lose almost all the static pressure provided by the fan (10). In this way the pressure gradient between the condenser zone and the vaporizer zone is obtained, higher than atmospheric pressure being created in the condenser zone and lower than atmospheric pressure in the vaporizer zone. For this reason a high pressure static fan is incorporated into the system. Its pressure is calculated as the difference between the pressure of steam saturated air at the temperature of the warmed sea-water at the entrance to the vaporizer and the pressure of steam saturated air at the temperature of the residual sea-water when it leaves the lower part of the vaporizer (4). To this difference has been added pressure losses suffered during its course through the desalinator, except for those caused by the calibrated orifices.

The behaviour of the air in its course through the illustrated desalinator plant of the invention is the following. (Naturally, the desalinating plant contains the air which it held when it was constructed.) Air penetrates the lower part of the ventilator after losing pressure at the calibrated orifices and its pressure at this point is lower than atmospheric pressure by more than the difference between the pressure of saturated steam at the temperature of the incoming warm sea-water and at the temperature of outgoing cold water. On passing through the vaporizer its temperature increases and it becomes laden with steam. When it reaches the fan it is at atmospheric pressure. The fan raises the pressure of the air -steam mixture to above atmospheric pressure and from the distribution of partial pressures at this point it can be deduced that the pressure of the water vapor is higher than the pressure of steam at that temperature, resulting in rapid and efficient condensation in the cooler. This means that, taking into account calculations of the energy efficiency of the condenser, and the energy contributed by the fan, there is no need to provide supplementary heating.

The sea-water of the cooler is warmed by the passage of hot air and, above all, by the condensation of steam. Its volume has been calculated so that the transfer of heat in the system raises the temperature to that required of the water at the vaporizer intake (3). Despite what has been stated in the previous paragraph, an auxiliary element is inserted between the water outlet of the condenser (2) and the water intake of the vaporizer (3) for the transitory period at the start of each process.

The water that is condensed on the plates of the cooler drops to the temperature of the (now) cooling sea-water and falls to the lower part of the condenser zone from where it is drawn into the pipe (6) by means of a centrifugal pump that is controlled by two gauges, one of which registers the maximum water level and the other, the minimum.

The apertures (16) facing the calibrated orifices are only to give access to the latter and are closed by means of blind flanges.

It is foreseen that the desalinator will be divided into the number of parts necessary to make its installation simple, and the assembly of the pieces that form the outer shell will be done in manner to ensure a watertight unit. The pieces forming the body of the condenser will also be assembled as a watertight unit.

Figure 2:
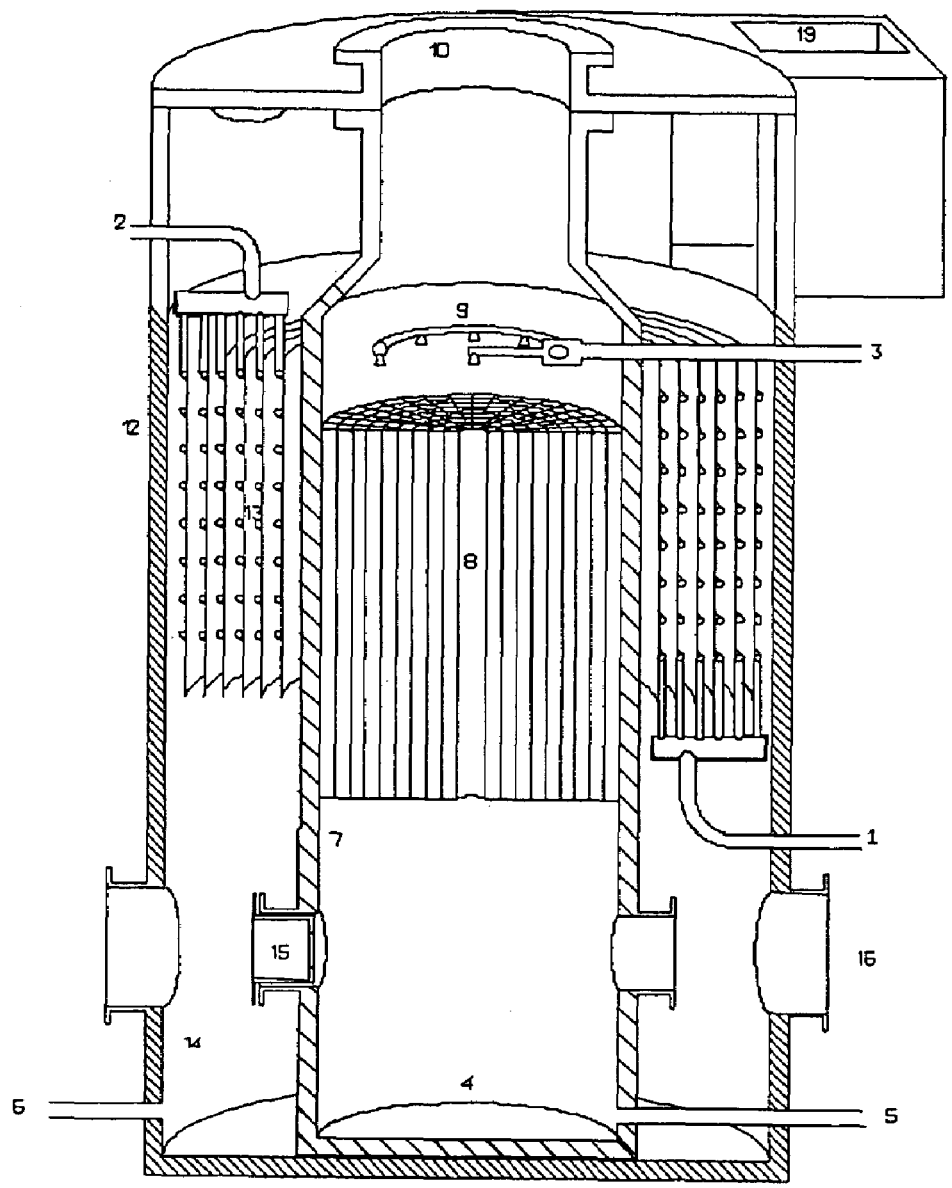
FIG. 2. Perspective view of vertical section at 180° of another version of the invention. This variant has a high power centrifugal fan attached externally; the fan is not depicted.

FIG. 2 shows a version of the invention for large capacity processing and for the state of the art in ventilators it is provided with a centrifugal fan (not illustrated) which would be situated in the upper part of the desalination plant. Air is extracted from the evaporator by the aperture (10) and is driven to the condenser by the entrance (19). In all other aspects the operation is identical to that shown in FIG. 1.

FIG. 3 shows the cooler-condenser element constructed as a series of concentric cylindrical surfaces with coiled piping as indicated and with the water intake set at the lower part and the outlet at the upper.

Field of the Invention

This invention has wide application in the field of refrigeration where it can be used to recover the energy consumed by condensers in refrigeration processes; this would be in the form of desalinated water which would be especially interesting in hotels in tourist areas where the domestic water supply is insufficient.

This invention is applicable in the industry using refrigerator-ships where energy consumed in the condensers of the freezers could be recovered as drinking water (after an additional processing).

This invention could be applied in thermal production of electrical energy where cooling towers could be substituted by fresh water/sea-water heat transformers. The contribution of demineralised water to a cooling tower in this industry is approximately 5% of the total water that circulates through the refrigeration circuit. This invention, using a fresh water/sea-water heat transformer, would avoid this loss of water and provide an equal quantity for other purposes.

It is applicable in all coastal regions where there is a need for drinking water. The minimal energy contribution to raise the temperature of the sea-water some twenty degrees could be obtained from:

The energy supplied to the fan which drives and recycles the air in a closed circuit of the process, avoiding loss of energy by hermetically sealing the apparatus.

Recovering energy from the condenser.

Thermal insulation between vaporizer and condenser and between condenser and the exterior.

Solar energy, easily obtained in tourist beaches.

From the surplus thermal energy of numerous industrial processes which could use this wasted energy for the desalination process described.

With the data and descriptions given above, the invention may now be considered sufficiently explained and its advantages and innovations made explicit. Its material, shape, size and layout are all open to modification providing that the modification does not entail any alteration in the essential features of the invention, The terms used in this specification should be understood in a wider sense, not a limited one.

The invention claimed is:

1. A plant for the desalination of sea water, the plant comprising an external body, the external body housing:
 (a) a watertight, open-ended, hollow and upright, outer cylinder;
 (b) an open-ended upright, inner hollow cylinder disposed inside the outer cylinder, the outer and inner cylinders being watertight with respect to one another and being thermally insulated from one another and from ambient conditions;
 (c) a fan disposed above the outer and inner cylinders and cooperative with the external body to drive air from the inner cylinder into the outer cylinder;
 (d) at least one air flow control orifice to reduce the pressure of the driven air, the at least one air flow control orifice being disposed in the lower half of the inner cylinder and opening into the outer cylinder;
 (e) a duct to supply warm sea water to be desalinated to the upper end of the inner cylinder;
 (f) a vaporizer comprising an array of sheets disposed in the inner cylinder, the sheets having evaporator surfaces to receive warm sea water descending from the duct and expose the warm sea water to ascending air wherein water can evaporate from the evaporator surfaces and be entrained in the ascending air;
 (g) an outlet to remove water of increased salinity from the external body, said water of increased salinity being water descended from the vaporizer;
 (h) a condenser disposed in the outer cylinder, the condenser comprising cylindrical, heat-conductive surfaces and piping for the supply of sea water coolant to cool the cylindrical heat conductive surfaces;

(i) a pipe for collection of desalinated water condensing in the condenser; and (j) a water distributor to distribute sea water from the duct evenly in the vaporizer, the water distributor optionally being a mist-generating water distributor wherein the plant comprises a closed circuit for recycling air driven by the fan, the closed circuit extending through the inner cylinder and through the outer cylinder;

wherein the condenser is connected to the vaporizer for the supply of sea water from the condenser to the vaporizer;

wherein the condenser piping comprises multiple turns of spirally ascending heat-conductive piping resistant to sea water corrosion surrounding the cylindrical heat conductive surfaces and wherein the cylindrical heat conductive surfaces are concentric and occupy an upper portion of the outer cylinder;

wherein the at least one air flow control orifice comprises a plurality of calibrated orifices providing reduced pressure in the vaporizer relatively to the condenser;

wherein the external body comprises a hemispherical portion enclosing the fan and the upper ends of the inner and outer cylinders and accommodating the water-vapor-entraining air driven from the inner cylinder to the outer cylinder; and wherein the plant comprises an ultraviolet lamp disposed within the hemispherical portion to prevent growth of fungi and bacteria.

2. A plant for the desalination of sea water by evaporation-condensation, the plant comprising:

(a) an air-containing evaporator body comprising an open upper section, a duct to introduce warm sea water to the open upper section of the evaporator body and extended surface area plates filling a horizontal cross-section of the evaporator body while permitting the passage of descending warm sea water;

(b) an air-containing condenser body comprising an open upper section, heat-conductive surfaces, an upwardly extending spiral of heat-conductive, corrosion-resistant piping for sea water cooling surrounding the heat-conductive surfaces, the heat-conductive surfaces and piping occupying a horizontal cross-section of the upper section of the condenser body through which air can pass downwardly, the evaporator and condenser bodies being thermally insulated from one another and from the external environment;

(c) a common wall watertightly separating the evaporator and condenser bodies;

(d) a hermetically sealed enclosure containing the evaporator and condenser bodies and the common wall;

(e) a fan connecting the open upper sections of the evaporator and condenser bodies to propel air within the enclosure from one body to the other body;

(f) a calibrated orifice situated in a lower portion of the common wall within the enclosure for the return of air to the fan, the calibrated orifice causing a fall in pressure of the returned air;

(g) a pump to return to the sea residual sea water having increased salinity; and, optionally, (h) an ultraviolet lamp located between the open upper sections of the evaporator and condenser bodies;

wherein air can be drawn upwardly by the fan through the evaporator body against the current of descending warm sea water, resulting in a portion of the warm sea water being evaporated to leave residual sea water of increased salinity for return to the sea utilizing the pump; and wherein air from the evaporator body laden with water vapor can pass downwardly through the condenser leading to condensation of collectable desalinated water on the condenser heat-conductive surfaces.

* * * * *